(12) United States Patent
Jarosz et al.

(10) Patent No.: US 8,611,005 B2
(45) Date of Patent: Dec. 17, 2013

(54) COMPENSATION FOR SELF-SCATTERING ON CONCAVE SCREENS

(75) Inventors: Wojciech Jarosz, Zurich (CH); Derek Nowrouzezahrai, Oakville (CA); Scott Watson, Marina Del Rey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 123 days.

(21) Appl. No.: 12/828,115

(22) Filed: Jun. 30, 2010

(65) Prior Publication Data
US 2011/0176067 A1    Jul. 21, 2011

Related U.S. Application Data

(60) Provisional application No. 61/296,463, filed on Jan. 19, 2010.

(51) Int. Cl.
*G03B 21/10* (2006.01)
*G03B 21/56* (2006.01)
*G03B 21/62* (2006.01)

(52) U.S. Cl.
USPC ............ 359/451; 345/581; 348/744; 359/443

(58) Field of Classification Search
USPC ................ 359/451; 348/744; 345/581, 585
See application file for complete search history.

(56) References Cited

U.S. PATENT DOCUMENTS

| | | | |
|---|---|---|---|
| 5,161,013 A * | 11/1992 | Rylander et al. | 348/744 |
| 6,097,556 A * | 8/2000 | Shatz et al. | 359/857 |
| 6,331,061 B1 * | 12/2001 | Shatz et al. | 359/857 |
| 6,462,769 B1 * | 10/2002 | Trowbridge et al. | 348/51 |
| 6,567,083 B1 * | 5/2003 | Baum et al. | 345/426 |
| 6,630,996 B2 | 10/2003 | Rao | |
| 6,809,809 B2 | 10/2004 | Kinney | |
| 7,408,986 B2 | 8/2008 | Winder | |
| 7,440,004 B2 | 10/2008 | Siegel et al. | |
| 7,558,320 B2 | 7/2009 | Winder et al. | |
| 7,995,092 B2 | 8/2011 | Lippey | |
| 8,085,217 B2 | 12/2011 | Slavenburg et al. | |

(Continued)

OTHER PUBLICATIONS

Sheng, Yu et al, Global Illumination Compensation for Spatially Augmented Reality, The Eurogrphics and Blackwell Publishing, vol. 29, No. 2, 2010.*
Bimber, Oliver et al, Compensating Indirect Scattering for Immersives and Seim-Immersive Projection Displays, IEEE Virtual Reality Mar. 25, 2006.*

(Continued)

*Primary Examiner* — Clayton E Laballe
*Assistant Examiner* — Kevin Butler
(74) *Attorney, Agent, or Firm* — Kilpatrick Townsend & Stockton LLP (57) ABSTRACT

Projection systems and methods handle images to be viewable on a concave surface, wherein the projected image is modified to account for surface-to-surface reflections due to the concave surface, by determining geometric surface parameters, determining the ideal image, determining a model for reflected light that is a result of surface-to-surface reflections given the ideal image, wherein the model is expressible in closed form, determining a compensation image to compensate for at least some of the surface-to-surface reflections, taking into account at least the ideal image and the reflected light, and combining the compensation image and the ideal image to form a projectable image that can be projected onto a surface having the determined geometric parameters. The surface can be defined by a portion of an interior of a sphere and the reflection of a given pixel can be modeled as a constant over the concave surface.

15 Claims, 2 Drawing Sheets

(56) References Cited

U.S. PATENT DOCUMENTS

| | | | |
|---|---|---|---|
| 8,339,333 | B2 | 12/2012 | Casner et al. |
| 2006/0268104 | A1 | 11/2006 | Cowan |
| 2007/0206155 | A1 | 9/2007 | Lipton |
| 2008/0094528 | A1 | 4/2008 | Robinson |
| 2008/0239067 | A1 | 10/2008 | Lipton |
| 2008/0239068 | A1 | 10/2008 | Lipton |
| 2009/0190210 | A1 | 7/2009 | Coleman |
| 2009/0297797 | A1 | 12/2009 | Coleman |

OTHER PUBLICATIONS

Mukaigawa, Yashuhiro, Analytical Compensation of Inter-reflection for Pattern Projection, ACM, Nov. 2006.*

Mukaigawa, Yasuhiro; Analytical Compensation of Inter-reflection for Pattern Projection; VRST'06, Nov. 1-3, 2006, Limassol, Cyprus.*

Bimber, O., et al., "Projector-Based Augmentation", Emerging Technologies of Augmented Reality: Interfaces and Design, 2006, pp. 64-89.

* cited by examiner

COMPENSATION FOR SELF-SCATTERING ON CONCAVE SCREENS

CROSS-REFERENCE TO RELATED APPLICATIONS

The present application claims benefit of priority under 35 USC §119(e) of U.S. Provisional Patent Application No. 61/296,463, filed on Jan. 19, 2010 and entitled "Compensation For Self-Scattering On Concave Screens", the entire contents of which are herein incorporated by reference for all purposes. The present disclosure may be related to the following commonly assigned application(s)/patent(s):

U.S. Provisional Patent Application No. 61/296,456, filed Jan. 19, 2010 and entitled "Perceptually-Based Compensation of Unintended Light Pollution of Images for Projection Display Systems" naming van Baar, et al.

U.S. Non-Provisional patent application Ser. No. 12/828,137, now U.S. Pat. No. 8,570,319 and entitled "Perceptually-Based Compensation of Unintended Light Pollution of Images for Projection Display Systems" naming van Baar, et al.

The respective disclosures of these application(s)/patent(s) are incorporated herein by reference in their entirety for all purposes.

FIELD OF THE INVENTION

The present invention relates to optical projection systems in general and in particular to optical projection systems that project onto a concave screen.

BACKGROUND OF THE INVENTION

When projecting onto a flat screen, light that bounces off the screen propagates away from the screen towards the audience so the viewers observe the intended image. However, when projecting onto a concave screen, the image that is projected not only reflects back towards the audience, but also scatters towards other regions of the screen. Therefore, points on a concave screen can be illuminated not only by the intended direct light from the projector, but also light reflected from other regions of the screen not intended for that point. This other light ends up "polluting" the intended image and results in significant image degradation through loss of contrast and detail.

As used herein, the term "concave screen" might refer to any screen that is not essentially planar. A screen can be an object specifically designed to receive and reflect light from a projector or might be an object for another purpose that is used as a screen, such as a portion of a wall of a building. In any case, the screen is positioned to receive light from a projector (or the projector is positioned relative to the screen) and when light is projected onto the screen, the light (perhaps not 100% of it—some might be absorbed) is reflected and viewers in range of the reflected light see the image or images being projected by the projector. Concave screens include curved screens, piecewise planar, piecewise curved, and/or spherical, such that light projected into one point on the screen can reflect to another point on the screen.

The way light behaves is that it propagates in a straight line until encountering something nontransparent. For purposes of this description, atmospheric and refractive interference with light propagation can be set aside or ignored. When light encounters the screen, the reflected light need not reflect equally in all directions, but typically to provide a good experience to viewers independent of their location within a wide viewing angle, a screen is usually made such that light reflects over a wide solid angle from points on the screen. Because of this behavior, light reflected from an essentially planar screen will not intersect the screen, but with a concave screen light can intersect the screen at more than one bounce.

This second and subsequent reflection can be a problem. For example, to show an image of a dark, unlit passageway in a movie, the image projected from the projector might block all light where the passageway is to be displayed. Depending on the nature of how the image was captured, such as digitally or on film, that information is represented by the digital values for the blackest black or by film that totally blocks the projector lamp from shining on that portion of the screen. However, if the image is part of an outdoor daytime shot, the image might include a brightly lit wall near the passageway. Because of how the light behaves, the light from the projector for the brightly lit wall will be projected on that portion of the screen where the wall is to be shown, but then some of the light will reflect from there and intersect the portion of the scene where the dark, unlit passageway is to be shown. This leads to loss of contrast, i.e., the intended dark areas are not as dark as the artist would be if the screen were flat.

Some projection systems use numerical compensation, but this is often not a satisfactory solution. Numerical optimization is a computationally expensive, iterative process often requiring the reducing of the resolution of the image to obtain efficient solutions. See, for example, [Bimber-A] Bimber, O., Grundhofer, A., Zeidler, T., Danch, D., and Kapakos, P., "Compensating Indirect Scattering for Immersive and Semi-Immersive Projection Displays", VR '06: Proceedings of the IEEE Conference on Virtual Reality, IEEE Computer Society, pp. 151-58 (Washington, D.C., USA, 2006) [cited as http://dx.doi.org/10.1109/VR.2006.34], [Mukaigawa] Mukaigawa, Y., Kakinuma, T., and Ohta, Y., "Analytical Compensation of Inter-Reflection for Pattern Projection", VRST '06: Proceedings of the ACM Symposium on Virtual Reality Software and Technology, ACM, pp. 265-68 (Limassol, Cyprus, 2006) [cited as http://doi.acm.org/10.1145/1180495.1180549], and [Bimber-B] Bimber, O., "Projector-Based Augmentation", Emerging Technologies of Augmented Reality Interfaces and Design", ed. Haller, M. et al., pp. 64-89 (2006).

For arbitrary concave screen configurations, the compensation can be solved using a number of available numerical techniques shown by [Bimber-A], [Mukaigawa] and [Bimber-B]. Unfortunately, these techniques either require an intractable amount of memory storage for high-resolution projected imagery, or require iterative processing and resolution reduction of the projected images to obtain efficient solutions.

In view of the above, it would be desirable to improve contrast and a viewing experience for concave screens.

BRIEF SUMMARY OF THE INVENTION

In embodiments of projection systems and methods, images to be viewable upon projection on a surface that allows for reflections off of one portion of the surface to impinge on another portion of the surface, wherein an ideal image is an image that is intended to be viewed and would be the projected image in the absence of surface-to-surface reflections, are images modified to account for the reflections by determining geometric parameters for the surface, determining the ideal image, determining the reflected light that is a result of surface-to-surface reflections given the ideal image, determining a compensation image to compensate for at least some of the surface-to-surface reflections, wherein determining a compensation image takes into account at least the ideal image and the reflected light, and combining the compensation image and the ideal image to form a projectable image that can be projected onto a surface having the determined geometric parameters.

Using embodiments of the present invention, for screen geometries that can be well approximated by a portion of a sphere, a preferred embodiment can solve for the compensated illumination very efficiently in both memory usage and computation time even for high-resolution images typical of cinematic projection.

In some embodiments, the surface is defined by a portion of an interior of a sphere, while in others, the surface is defined by another concave or partially concave surface.

The following detailed description together with the accompanying drawings will provide a better understanding of the nature and advantages of the present invention.

DETAILED DESCRIPTION OF THE INVENTION

An improved image projection system is described herein, however it should be understood that the inventive system need not require a projector and/or a screen, but might be an image processing system that processes images that can then be sent to a projector for projection onto a screen. In the image processing system, a model of the screen is used to determine the sum of the light bounces between points on the concave screen. Light is additive, so if the image processing system can subtract the light expected to form these polluting reflections based on the screen model, the image can be improved. Methods and apparatus described herein can significantly simplify the equations, often to the point where real-time processing is possible (where the image to be projected is not known until shortly before it is to be displayed).

The model is then used by the image processing system to determine, given a desired image, I, what compensated image, I', to project so that when light does bounce according to the model, a resulting image, $I_R$, close to the desired image I is viewed on the screen. Often, the desired image is an image that the artist, animator and/or director specifies is to be the image. In some cases, it is an "effective image" that is the desired image distorted by the inverse of the screen shape. An effective image displayed on a flat surface might appear distorted, but when displayed on the concave screen appears normal. There are a number of operations, desired or undesired, that create differences between what is projected and what is seen by viewers. The resulting image $I_R$ might not exactly match the desired image I for several reasons.

One reason is that rounding errors might be introduced in the model and/or the compensation process. Another reason is that the model might not be exactly correct, in the screen position relative to the projector lens, the reflectivity of the screen, etc. Yet another reason is that the compensated image I' might include negative light values (such as where the desired image has zero light and the model indicates that some light from other points needs to be subtracted) that cannot be projected. Some of these can be dealt with using further compensation, but it should be understood that using the present invention, it might be sufficient to generate an entirely satisfactory resulting image $I_R$ that is not identical to the desired image I. While the resulting image might not exactly match the desired image, it can often be sufficient to provide some improvement such that the resulting image is closer to the desired image.

With "light pollution" (e.g., uncontrolled light falling on portions of the screen undesirably), it can be in part corrected for by compensation of light values at various pixel locations. One approach to solving the compensation process is to determine, from the desired image, what light pollution would occur on a first bounce, a second bounce, and so on, then compensate for that, then iterate using the first-round compensated image to form a second-round compensated image, etc. The iteration takes into account the fact that the initial light pollution calculations are for the initial image and as light pollution is removed by compensation, the calculations change, a little or a lot.

With some screen shapes, the potentially infinite iteration and bounce calculation can be distilled down to just a few steps. For example, done properly, if the screen surface is a portion of a sphere, compensation can be done in a single pass, subtracting a constant light value from each pixel (and possibly clamping values to not go below zero). Ignoring lens offsets, screen imperfections and clamping, this one-pass compensation results in perfect descattering for dome-shaped screens.

It is not always possible to reproduce physically because it might require "negative" light. Since negative light does not exist in reality, the image processor clamps the resulting solution to remain non-negative, which re-introduces error into the observed image. The system can either accept these minor remaining errors or switch to a more computationally expensive compensation technique to address those errors.

One of the advantages of performing compensation is that more scenes with wide dynamic ranges can be presented (such as images with light regions and dark regions). Another advantage is that images can be handled in full-resolution and possibly in real-time. Thus, images can be processed in native IMAX or other resolution during the compensation process without the need to down-sample the image before computation.

Selected Embodiments

Details of selected embodiments will now be described.

Figure 1:
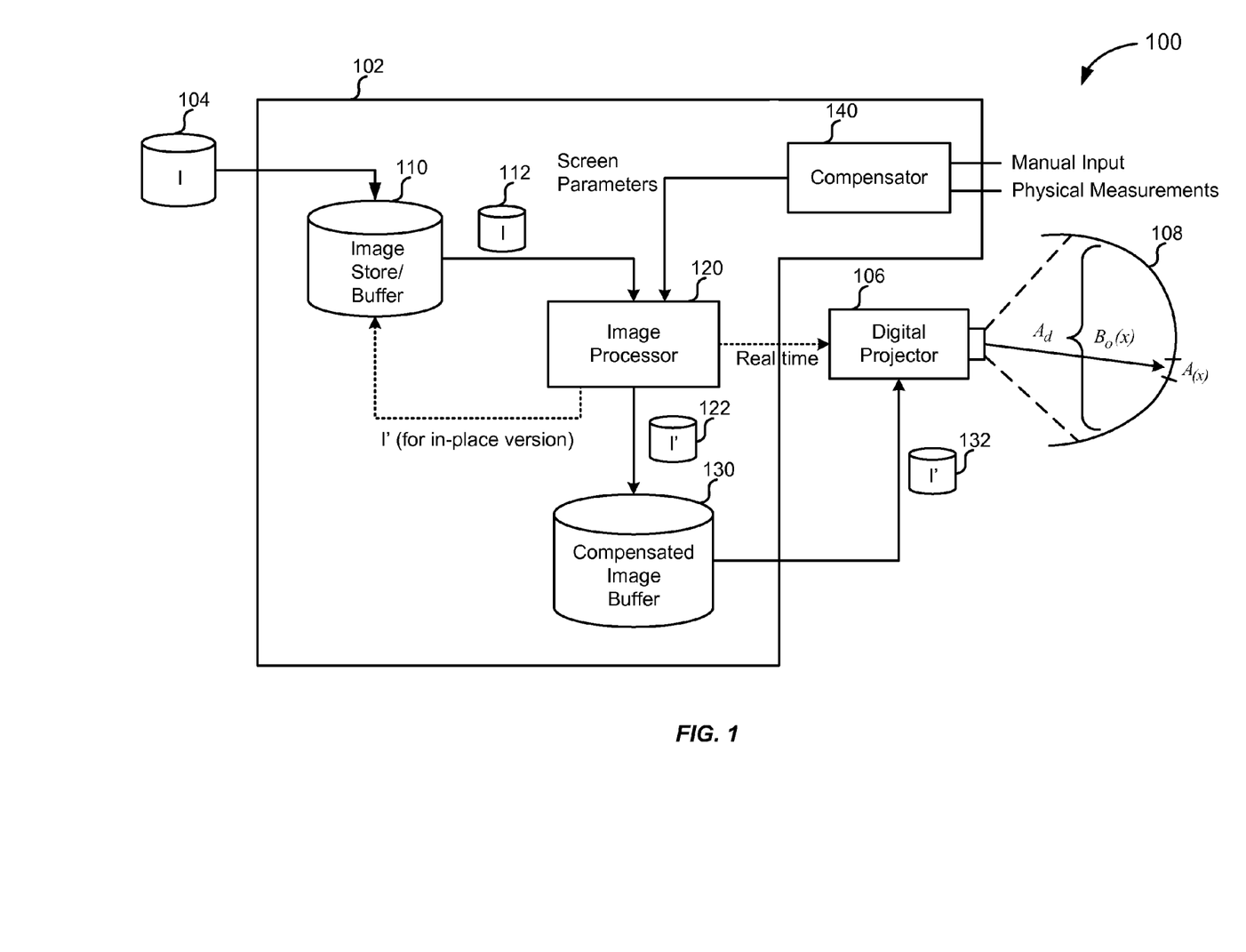
FIG. 1 illustrates a projection system according to aspects of the present invention including an image preprocessing system that adjusts images to account for their eventual projection onto a concave screen.

FIG. 1 illustrates a projection system 100 according to aspects of the present invention. As illustrated there, an image processing system 102 is coupled to receive images from an image source 104. Although illustrated as single image data elements, it should be understood that the system can be used for image sequences, such as a video sequence. The images that image processing system 102 receives can be processed to form compensated images 132 that can be provided to a projector 106 for projection onto a concave screen surface 108. However, image processing system 102 also has utility in processing images and storing the compensated images without projecting—that can be done by another entity.

In the example shown, image processing system 102 comprises an image store/buffer 110 for storing images permanently or temporarily (such as a memory device) and for providing images 112 to an image processor 120, as requested. Image processor 120 forms compensated images 122 from the original images and screen parameters from a compensator module 140. When the images are processed in place, the compensated images are written to memory overwriting the image in store/buffer 110, but in other implementations, the compensated images are stored elsewhere, in store/buffer 130. In some implementations, the images flow in real-time and are not stored. In some implementations, the two image store/buffers are implemented within one memory element.

It should be understood that image processor 120 can be implemented with dedicated hardware or program code executed by a computer processor. Where real-time processing is not performed, image processor 120 might be separate from a projection system and could generate compensated images earlier than needed. In some cases, image processor 120 might be part of an animation system, so that once desired images are generated, they can be compensated for and the compensated images output as the output of the animation system. However, this might fix the screen parameters.

Compensator module 140 generally determines the parameters to provide to image processor 120 for use in forming compensated images. In some implementations, compensator module 140 is an integrated part of the system. For example, where everything is implemented in program code stored in a program memory and executed by a processor to implement the functionality described, the program code might be integrated. In any case, compensator module 140 uses inputs about the screen to provide screen parameters. The inputs might be manual inputs from an operator, or might be physical measurements made by a measuring system (automated or manual). Examples of some of the inputs might be the distance from the projector lens to the screen, the shape of the screen surface, the extent of the screen surface, the radius of curvature at one or more points, the ambient light, position (expected or actual) of viewers, radiosity of screen surface in one or more directions, and the like.

In operation, digital projector 106 can be a conventional projector that accepts digital images or sequences and projects them into a space, which may result in them being reflected from a concave screen surface. The projector does not need to be digital, but preferably the processing is done digitally and provided digitally to a digital projector or converted to analog for an analog projector.

In operation, images are input to image processing system 102, compensated for (according to the screen parameters provided) and the compensated images are provided to projector 106, which projects them onto as concave surface of screen 108. Of course, nothing prevents the entire system from being used for convex screen surfaces and flat screen surfaces. In such cases, image processing system 102 might pass images through unchanged or the screen parameters are set such that compensation has no effect on the images. In the instance shown, the screen surface is concave and it is expected that some portions of the surface will be illuminated from light reflected from other portions of the surface.

In the example projection system of FIG. 1, several references are indicated and are used below in various calculations. In FIG. 1, $A_d$ refers to the portion of the surface illuminated by the projector (and may include some portions that are not directly illuminated), and $A(x)$ refers to an area of the screen surface illuminated by a pixel of the image, while $B_i^0$ is the direct illumination radiosity of pixel i.

In this example, the screen has a concave surface that approximates an interior of a sphere. $A_i$ is the projected area of a single pixel i onto the surface, $\overline{A}$ ($A_d$, as in FIG. 1) is the projected area of the entire image onto the screen surface, and $B_i^0$ is the direct-illumination radiosity of pixel i. The total area of the projected image onto the screen surface can be expressed as either a percentage, p, of the total area of the sphere $\overline{A}=4\pi p$, or as a sum over the projected areas of each pixel, as set out in Equation 1.

$$\overline{A} = \sum_{i=1}^{N_p} A_i \quad \text{(Eqn. 1)}$$

In Equation 1, $N_p$ is the number of pixels. It can be assumed that the radiosity over $A_i$ due to direct-illumination from the projector is constant and equal to $B_i^0$ such that the terms "patch" and "projected area" can interchangeably refer to the area induced by the projection of a pixel onto the screen surface. In these definitions, discrete quantities can be assumed defining a vector of patch areas and radiosities across the pixels and, when appropriate, function notation (e.g., A(x)) will indicate continuous quantities.

Figure 2:
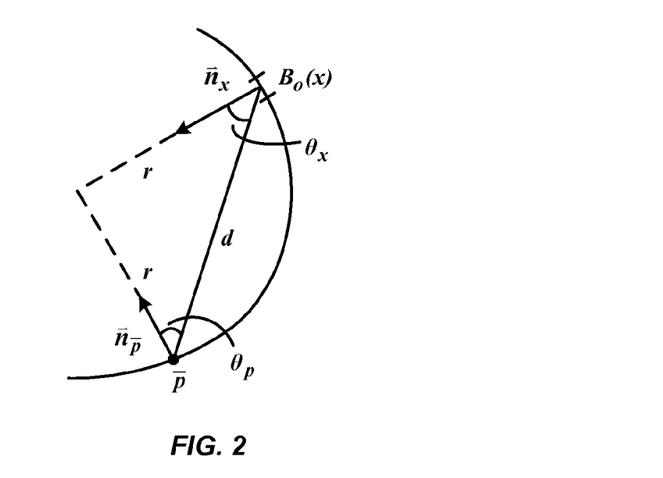
FIG. 2 illustrates geometry that the image processor takes into account for a concave screen.

FIG. 2 illustrates how the image processor might compute a first bounce of indirect illumination at a point $\overline{p}$ due to direct lighting from a single pixel. In FIG. 2, $\vec{n}_p$ and $\vec{n}_x$ are unit length normals at $\overline{p}$ and x, while r is the radius of the screen surface and d is the distance between $\overline{p}$ and x. While "x" is used for both a pixel and the 3D point on the screen surface at the center of the pixel's projection, this should not be ambiguous to one of skill in the art. As shown, the first bounce of indirect light at $\overline{p}$ due to $B^0(x)$ over area $A(x)$ is as set forth in Equation 2, where ρ is the diffuse reflectivity of the screen surface (assuming uniform reflectivity for this example) and the term within square brackets is a point-to-point form factor that takes foreshortening into account at both the receiver $\overline{p}$ and points and sender x points as well as the inverse-squared distance intensity fall-off. The geometry induces a constant visibility of 1 (i.e., any pair of points on the inside of the sphere are mutually visible) and so this term is not needed in Equation 2.

$$B_x^1 \overline{p} = \frac{\rho}{\pi} \int_{A(x)} B^0(x) \left[ \frac{\cos\theta_p \cos\theta_x}{d^2} \right] dA(x) \quad \text{(Eqn. 2)}$$

Since the triangle inscribed by the (extruded) normals and the line between sender and receiver is an isosceles triangle, $\theta=\theta_p=\theta_x$, the form factor term ($\cos\theta_p \cos\theta_x/d^2$) in Equation 2 can be simplified using the law of cosines, with the result that is shown in Equation 3.

$$c^2 = a^2 + b^2 - 2ab\cos(\gamma) \quad \text{(Eqn. 3)}$$

Substituting the geometry from FIGS. 2, c=d, a=b=r and $\gamma=\pi-\theta-\theta=\pi-2\theta$, so the form factor calculated by the image processor is as shown in Equation 4.

$$\text{form factor} = \frac{\cos\theta\cos\theta}{d^2} \quad \text{(Eqn. 4)}$$

$$= \frac{\cos\theta}{r^2 + r^2 - 2r^2 cis(\pi - \theta - \theta)}$$

-continued $$= \frac{\cos^2\theta}{2 - 2\cos(\pi - 2\theta)}$$

$$= \frac{\cos^2\theta}{2 + 2\cos(2\theta)}$$

$$= \frac{\cos^2\theta}{2(1 + \cos(2\theta))}$$

$$= \frac{\cos^2\theta}{2(1 + 2\cos^2\theta - 1)}$$

$$= \frac{1}{4}$$

Note that the first bounce of indirect light from a single pixel is spatially constant—thus it can be expected to evenly illuminate all of the screen equally. Using this result of Equation 4 and Equation 2, the combination is shown by Equation 5, which can be used by the image processor in generating the compensated image I'.

$$B_x^1 = \frac{\rho}{4\pi} \int_{A(x)} B^0(x) \, dA(x) \qquad \text{(Eqn. 5)}$$

$$= \frac{\rho}{4\pi} B^0(x) \int_{A(x)} dA(x)$$

$$= \frac{\rho}{4\pi} B^0(x) A(x)$$

The spatial parameter $\bar{p}$ is not required, since $B_x^1$ does not vary spatially. The contribution of the first bounce of indirect lighting due to all pixels can then be represented as shown by Equation 6. It should be understood that such representation can be done by suitable programming methods, such as performing calculations in the image processor according to program code and/or memory storage of variables and constants.

$$B^1 = \frac{\rho}{4\pi} \sum_{i=1}^{N_p} B_i^0 A_i \qquad \text{(Eqn. 6)}$$

$$= \frac{\rho}{4\pi} B^0 \cdot A$$

$$= \frac{\rho}{4\pi} W^0$$

In Equation 6, $W^0$ is the projected-area-weighted radiosity from all pixels of the projector (the flux, or wattage, across the screen surface due to direct-illumination). This value can be computed once from the input image (and the constant projected areas: $A_i, \forall i$).

In the above, there might be an assumption of uniform radiosity, i.e., that each pixel projects a single color value, but for projectors with more complicated projections, other variations can be used. The above equations assume completely diffuse (or Lambertian) reflection, which means it does not matter whether the light is coming from the center of the sphere, but with some changes (or not), this could work for other situations where the assumptions are not warranted.

Similarly, each subsequent bounce will also have a constant value and a recurrence relation describing the constant indirect light for an arbitrary bounce n of indirect light can be derived and the image processor configured to use that relation.

Similarly to Equation 6, the indirect lighting from the second bounce of light can be expressed as the integral over all surfaces emitting the first bounce of indirect light. This is equivalent to associating the constant value of the first bounce of indirect light with the radiosity of each projected pixel's surface area, and thus $$B^2 = \frac{\rho}{4\pi} \sum_{i=1}^{N_p} B_i^1 A_i \qquad \text{(Eqn. 7)}$$

$$= \frac{\rho}{4\pi} \sum_{i=1}^{N_p} \left[\frac{\rho}{4\pi} W^0\right] A_i$$

$$= \left(\frac{\rho}{4\pi}\right)^2 W^0 \sum_{i=1}^{N_p} A_i$$

$$= \left(\frac{\rho}{4\pi}\right)^2 W^0 \bar{A}$$

Similarly using the second bounce of indirect light as the seed illumination, the third bounce of indirect light is as shown in Equation 8.

$$B^3 = \frac{\rho}{4\pi} \sum_{i=1}^{N_p} B_i^2 A_i \qquad \text{(Eqn. 8)}$$

$$= \frac{\rho}{4\pi} \sum_{i=1}^{N_p} \left[\left(\frac{\rho}{4\pi}\right)^2 W^0 \bar{A}\right] A^i$$

$$= \frac{\rho^3}{4\pi} W^0 \bar{A}^2$$

Clearly, the $n^{th}$ bounce of indirect light from all pixels on the screen surface is as shown in Equation 9.

$$B^n = W^0 \left(\frac{\rho}{4\pi}\right)^n \bar{A}^{(n-1)} \qquad \text{(Eqn. 9)}$$

Given this recurrence relation, we can derive the total indirect illumination from an infinite number of bounces due to the projected image onto the screen surface. The total indirect illumination is an infinite sum of all indirect bounces and reduces down as shown in Equation 10.

$$B_{indirect} = \sum_{n=1}^{\infty} B^n = \sum_{n=1}^{\infty} W^0 \left(\frac{\rho}{4\pi}\right)^n \bar{A}^{(n-1)} \qquad \text{(Eqn. 10)}$$

Simplifying and performing the sums, the result of Equation 11 is provided.

$$B_{indirect} = \frac{\rho W^0}{4\pi - \rho \bar{A}} \qquad \text{(Eqn. 11)}$$

Image Compensation for De-Scattering the Screen Surface

From the indirect scattering calculation on the screen surface due to any projected image, the image processor can invert the process to come up with a compensated image to project onto the screen surface in order to obtain a resulting image on the screen surface.

Image formation on the screen surface can be represented in the image processor by a matrix stored in memory that can be inverted in order to compute the compensated projector image. The structure of this matrix formulation can be used to accelerate this computation with an analytic solution and low memory complexity, as explained further herein. The implications of such an algorithm is that the de-scattering compensation for an image can be done with around the same amount of storage as the image itself and can scale linearly in the number of pixels. The image can be processed using non-matrix methods as well.

Matrix Image Formation

Where the projection system represents the scatters along the lines of Equation 11, the projection system might represent and store the compensated image I' and image I", the latter of which is a representation of what is expected to be the final observed image upon projection of image I' onto the screen surface and preferably close to the original desired image I. The relationship between I' and image I" can be represented by Equation 12, where I' and I" are represented as column vectors of size $N_p \times 1$, and M is a matrix of size $N_p \times N_p$.

$$I''= M \cdot I' \quad \text{(Eqn. 12)}$$

This matrix M is the sum of two matrices, one representing for the direct lighting contribution on the screen surface due to the projected image, and one representing the (spatially constant) scattered contribution on the screen surface, as represented in Equation 13.

$$M = M_{direct} + M_{scattered} \quad \text{(Eqn. 13)}$$

$M_{direct}$ merely replicates the components of I' onto I" and thus $M_{direct}$=I'. From Equation 11, the scattered contribution to I" is a column-vector with a constant value, and so each row of $M_{scattered}$ is identical. Given these two observations about the direct and scattered components of M, we can express the elements of the image formation matrix M as shown in Equation 14, where $\delta_{ij}$ is the Kroenecker delta, which takes on a value of 1 when i=j and 0 otherwise).

$$M_{ij} = \delta_{ij} + \frac{\rho A_j}{4\pi - \rho \overline{A}} \quad \text{(Eqn. 14)}$$

Combining terms results in Equation 15.

$$I'' = I' + M_{scattered} \cdot I' \quad \text{(Eqn. 15)}$$

In Equation 15, $m_{scattered}$ is equal to $$\frac{\rho A_j}{4\pi - \rho \overline{A}}$$

and is a row-vector containing a single row of the matrix $M_{scattered}$, and where the addition of the scalar on the right-hand-side is performed component-wise with the image vector. As should be apparent from this teaching, the observed image can be simply the projected image plus a scalar scattering term.

Inverting Image Formulation

One goal of scattering compensation is to determine an image to project, I', such that viewers can be expected to observe on the screen surface an image I" that is close to the desired image, I. This can be done by the projection system, such as by its image processor, by calculating a solution for I' in Equation 12 from knowledge of I and setting I" in Equation 12 equal to I. This could involve inverting the matrix M of Equation 12. General matrix inversion is a costly computation that does not scale favorably—the memory requirements are $O(N_p^2)$ and the computational time is $O(N_p^{2.3376})$ with some of the fastest known algorithms. Using the teachings herein, an image processor can use an analytic process and exploit the structure of the matrix M to form an image using a process that has $O(N_p)$ complexity in both memory space and time.

Analytic Linear Time/Space Process

Let $N=M^{-1}$ with size $N_p \times N_p$. The structure of the M is the identity matrix plus a matrix whose rows are equal. Furthermore, the elements of these rows are a constant times the projected areas of the projector pixels, $A_j$, as explained above. From this organized structure, the inventors noted the possibility of a simple analytic inversion process. This possibility was confirmed with conventional symbolic computation packages and results confirmed both analytically and empirically. The elements of N are as illustrated in Equation 16.

$$N_{ij} = \delta_{ij} - \frac{\rho A_j}{4\pi} \quad \text{(Eqn. 16)}$$

Again, due to the structure of N, a vector-product can be used instead of matrix multiplication, with the result shown in Equation 17, where $n_{scattered}=(\rho A_j)(4\pi)$ is a row-vector.

$$I' = I + n_{scattered} \cdot I \quad \text{(Eqn. 17)}$$

Using programming code represented by Equation 17, the image processor can compute the compensated projection image I' from the original image I in $O(N_p)$ time. The image I' can even be computed in-place, using only an extra single double of storage or other small memory or register location in addition to the storage for the input image (which is reused for the compensated image as it is generated from the input image.

The processing done by the image processor can use the same resolution for the image scattering formulation (Equation 15) and for the image de-scattering formulation (Equation 17). In the first process, the image processor reads in the projected image and adds a scalar scattering term across the whole image to obtain the observed image with scattering. In the second process, the image processor reads in the desired image and subtracts a scalar de-scattering term across the whole image to obtain the compensated image. This lends itself to real-time compensation of images with very high resolutions, without requiring sub-sampling of the desired image or an iterative process.

Figure 3:
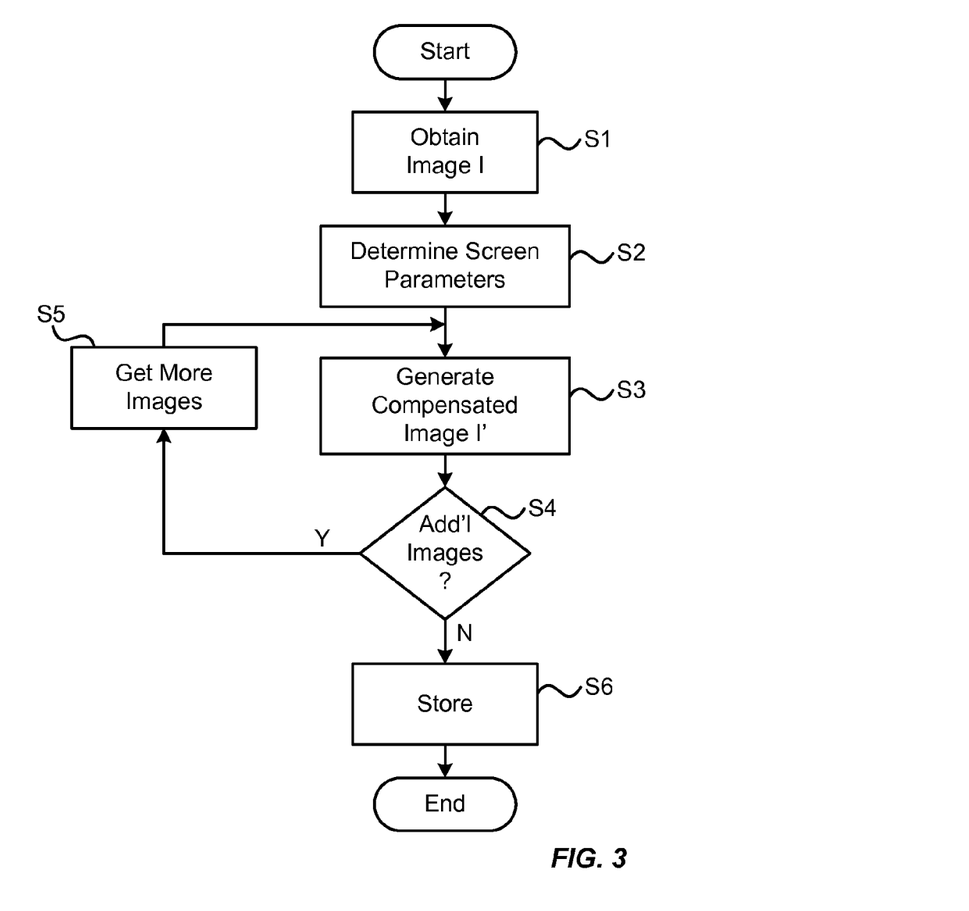
FIG. 3 illustrates a flowchart of a process for preprocessing an image.

FIG. 3 illustrates a flowchart of a process for preprocessing an image. As illustrated there, the process begins by obtaining an image (step S1). This can be by reading it from a storage device, receiving it from another system or module, as a file or a stream, or other methods. However it is done, the image processor would then have access to the electronic data representing the image. The image can be a sequence of images forming a video sequence, such as a feature film, a ride display or other uses.

The image processor then (S2) obtains screen parameters. This might be provided by the projector, provided manually by an operator, obtained via sensors or by the use of default settings stored in readable memory accessible by the image processor or as part of the program code for image processing. From the image and the screen parameters, the image processor generates a compensated image (or a delta of the image that would result in the compensated image) at step S3. If there are more images (S4), the process can continue with getting more images (S5), otherwise the results are stored (S6) and the process ends.

As has now been explained, an image processor to be used with a projector that projects onto a concave screen will determine reflections that would occur due to the screen curvature and back-calculate what compensated image is to be projected such that the resulting illumination at each point on the screen is as close as possible to the original unpolluted image. The result is a computational removal, or subtraction, of self-scattering effects on concave screens, which provides for contrast enhancement and other benefits.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A projection system for use in projecting images with light onto a surface that allows for reflections off of one portion of the surface to impinge on another portion of the surface, the projection system comprising:
   inputs for geometric parameters for the surface;
   an image processor that processes an ideal image, wherein the ideal image is an image that is intended to be viewed and would be a projected image in the absence of surface-to-surface reflections, to calculate a projectable image according to a compensation image representing a closed form model of a sum of a plurality of surface-to-surface reflections for the ideal image given the geometric parameters, the projectable image being a combination of the ideal image and the compensation image; and
   a projector for projecting the projectable image onto the surface, consistent with the geometric parameters.

2. The projection system of claim 1, wherein the inputs for geometric parameters for the surface comprise an interface to a memory device wherein the geometric parameters are stored in electronically readable form.

3. The projection system of claim 1, wherein the geometric parameters for the surface comprise a radius of curvature for a spherical screen surface, an indication of boundaries of the spherical screen surface and an indication of a projector lens location relative to the surface.

4. The projection system of claim 1, wherein the surface is defined by a portion of an interior of a sphere and wherein the closed form model corresponds to indirect reflected light wherein light from each of a plurality of pixels is represented by a constant illumination over the surface from reflected light from that pixel.

5. The projection system of claim 1, wherein the projection image represents the ideal image with the compensation image subtracted therefrom, and with pixels resulting in negative light values assigned a value associated with zero light.

6. A projection system for use in projecting images with light onto a surface that forms at least approximately a portion or all of an interior of a sphere, and that allows for reflections off of one portion of the surface to impinge on another portion of the surface, the projection system comprising:
   inputs for geometric parameters for the surface;
   an image processor that processes an ideal image, wherein the ideal image is an image that is intended to be viewed and would be a projected image in the absence of surface-to-surface reflections, to calculate a projectable image according to a compensation image representing a closed form model of a sum of a plurality of surface-to-surface reflections for the ideal image given the geometric parameters, the projectable image being a combination of the ideal image and the compensation image; and
   a projector for projecting the projectable image onto the surface, consistent with the geometric parameters.

7. The projection system of claim 6, wherein the inputs for geometric parameters for the surface comprise an interface to a memory device wherein the geometric parameters are stored in electronically readable form.

8. The projection system of claim 6, wherein the geometric parameters for the surface comprise a radius of curvature for the sphere, an indication of boundaries of the screen surface and an indication of a projector lens location relative to the surface.

9. The projection system of claim 6, wherein the closed form model corresponds to indirect reflected light wherein light from each of a plurality of pixels is represented by a constant illumination over the surface from reflected light from that pixel.

10. The projection system of claim 6, wherein the projection image represents the ideal image with the compensation image subtracted therefrom, and with pixels resulting in negative light values assigned a value associated with zero light.

11. A method of adjusting a projected image to account for surface-to-surface reflections of a projection surface that forms at least approximately a portion or all of an interior of a sphere and is such that reflections off of one portion of the surface can impinge on another portion of the surface, the method comprising:
    obtaining a base projection image;
    obtaining inputs for geometric parameters for the surface;
    computing a compensation image using a closed form model of a sum of a plurality of surface-to-surface reflections for an ideal image given the geometric parameters, wherein the ideal image is an image that is intended to be viewed and would be a projected image in the absence of surface-to-surface reflections;
    combining a base projection image with the compensation image to form a projectable image; and
    projecting the projectable image onto the surface, consistent with the geometric parameters.

12. The method of claim 11, further comprising:
    storing the inputs for geometric parameters for the surface in a memory device in electronically readable form; and
    reading the inputs for geometric parameters for the surface from the memory device.

13. The method of claim 11, wherein the geometric parameters for the surface comprise a radius of curvature for the sphere, an indication of boundaries of the screen surface and an indication of a projector lens location relative to the surface.

14. The method of claim 11, wherein the closed form model corresponds to indirect reflected light wherein light from each of a plurality of pixels is represented by a constant illumination over the surface from reflected light from that pixel.

15. The method of claim 11, further comprising:
determining if subtracting the compensation image from the base projection image results in negative light values; and
if pixels of a resulting image have negative light values, assigning those pixels a value associated with zero light.

* * * * *